United States Patent [19]

Saburi

[11] 4,028,497
[45] June 7, 1977

[54] ACQUISITION TECHNIQUE FOR TIME DIVISION MULTIPLE ACCESS COMMUNICATION SYSTEM

[75] Inventor: Akio Saburi, Tokyo, Japan

[73] Assignee: Nippon Electric Company, Ltd., Tokyo, Japan

[22] Filed: Apr. 1, 1976

[21] Appl. No.: 672,797

[30] Foreign Application Priority Data

Apr. 4, 1975 Japan .................... 50-41437

[52] U.S. Cl. ........................... 179/15 BS; 325/4
[51] Int. Cl.² ................................ H04J 3/06
[58] Field of Search .......... 325/4; 179/15 BS; 178/69.5 R

[56] References Cited
UNITED STATES PATENTS

| | | | |
|---|---|---|---|
| 3,813,496 | 5/1974 | Maillet | 325/4 |
| 3,843,843 | 10/1974 | Solomon | 325/4 |
| 3,958,083 | 5/1976 | Hara | 179/15 BS |
| 3,982,075 | 9/1976 | Jefferis | 179/15 BS |

*Primary Examiner*—David L. Stewart
*Attorney, Agent, or Firm*—Ostrolenk, Faber, Gerb & Soffen

[57] ABSTRACT

An initial acquisition technique for a time division multiple access (TDMA) communication system, employing an access signal of a frequency varying periodically in a predetermined relation to the TDMA time frame. Means are provided for detecting when the frequency of the signal as relayed back to the accessing station is at a predetermined value or within a predetermined frequency band to obtain the desired transmission timing information without necessitating use of any automatic frequency control means despite any deviation in the central frequency of the signal occurring during its travel.

17 Claims, 23 Drawing Figures

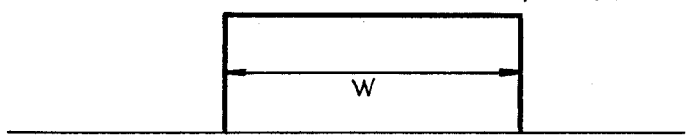
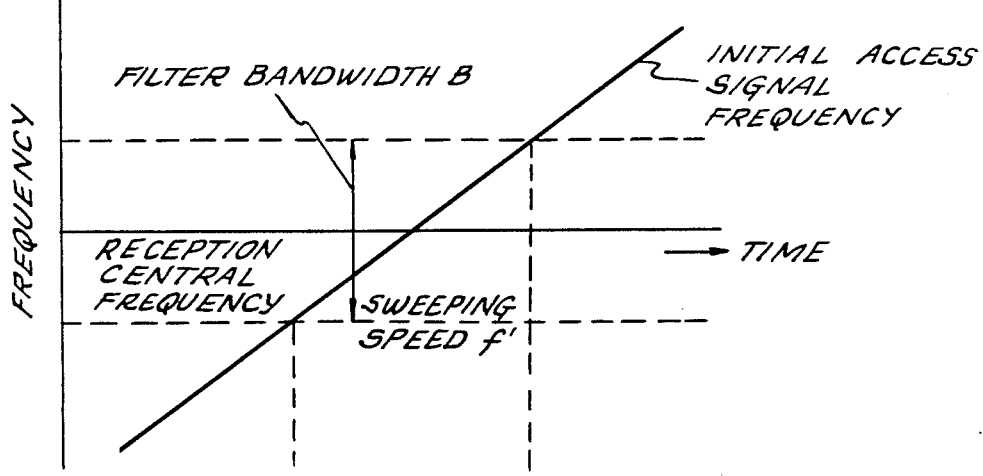
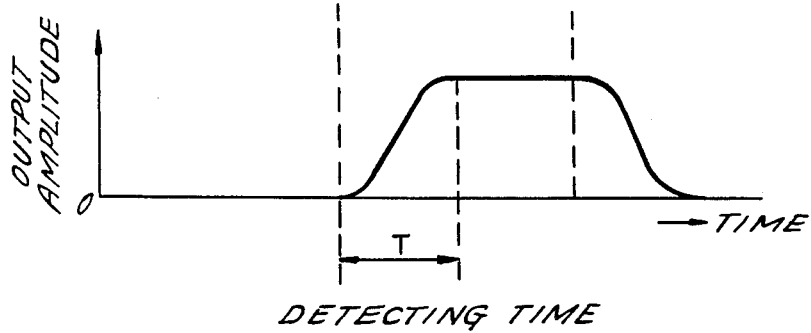

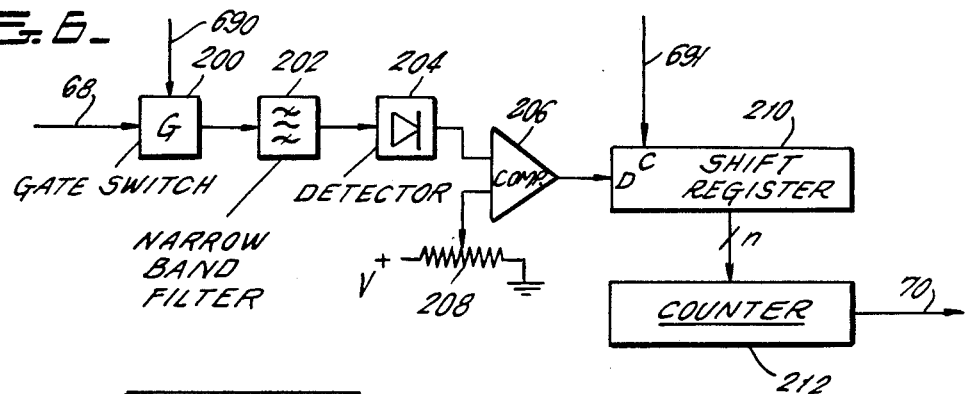
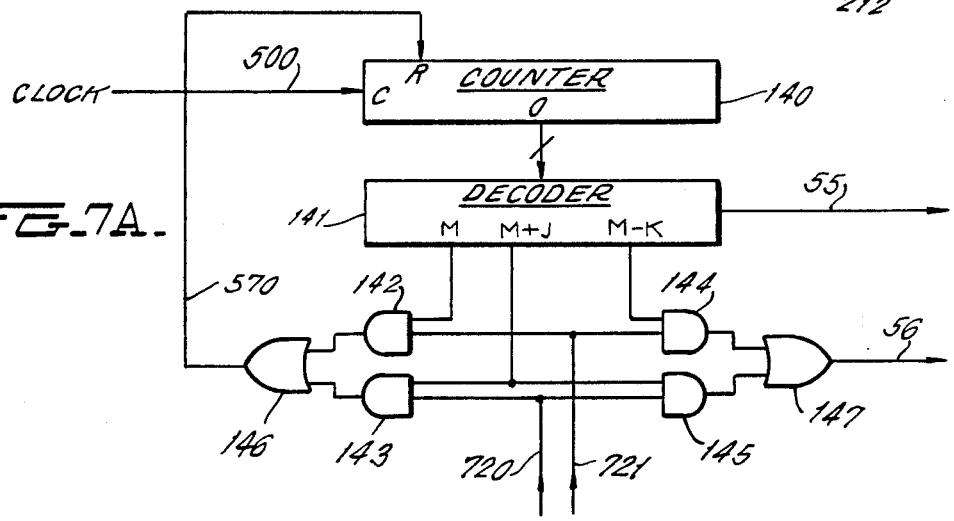
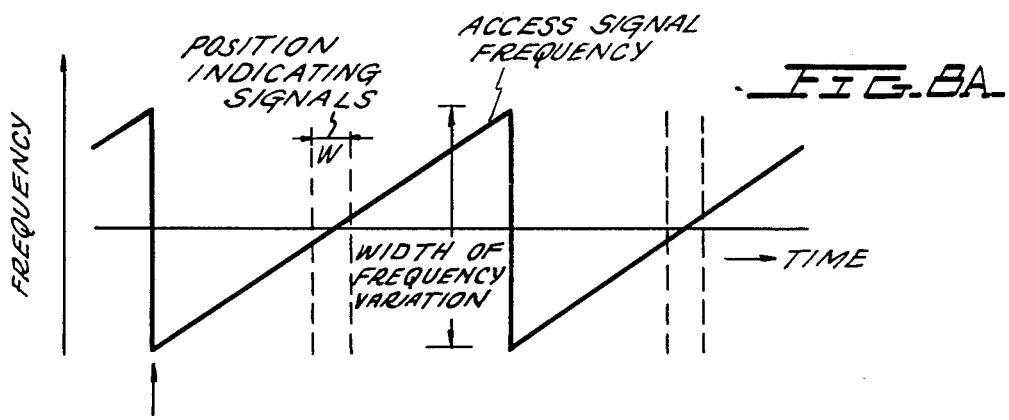
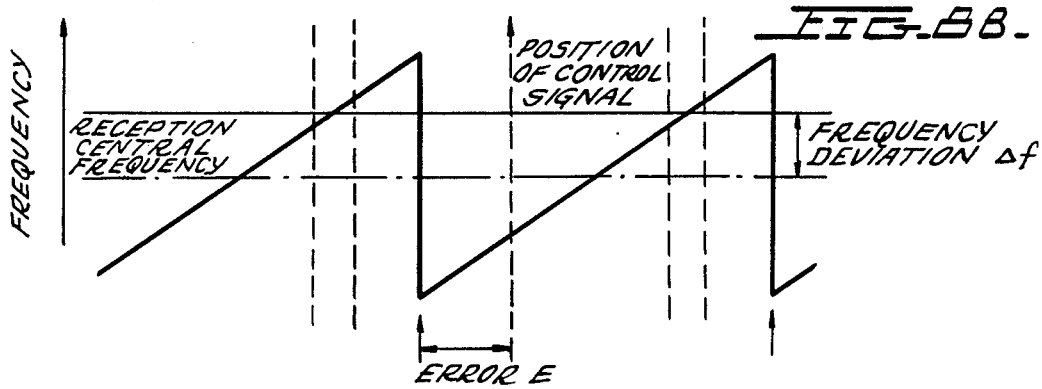

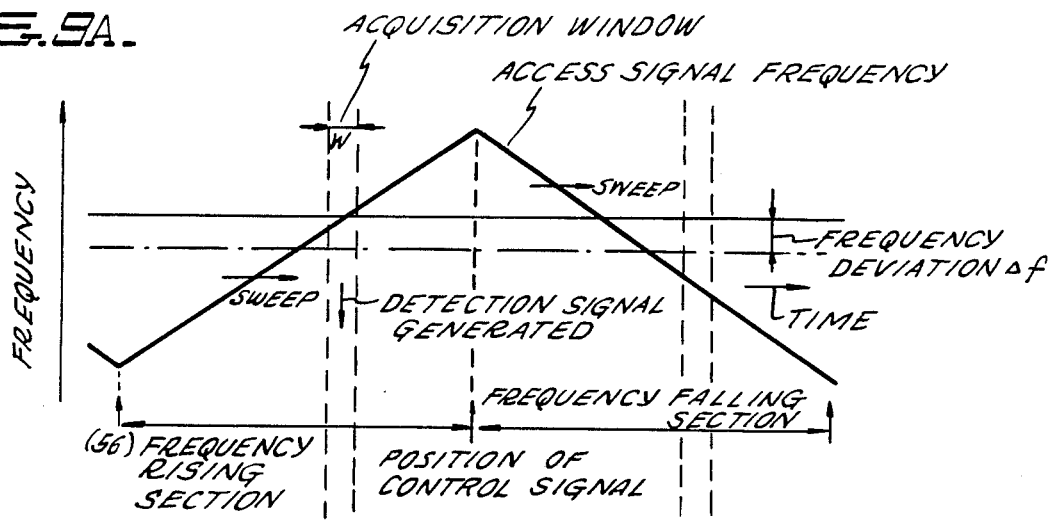
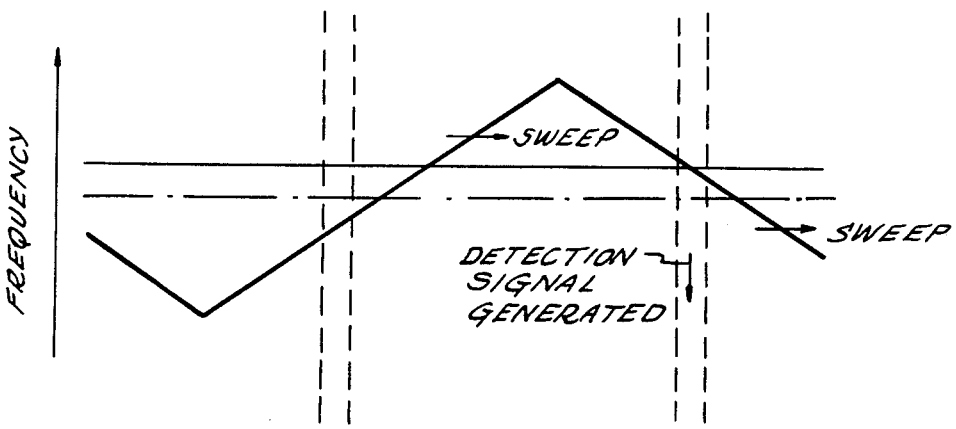
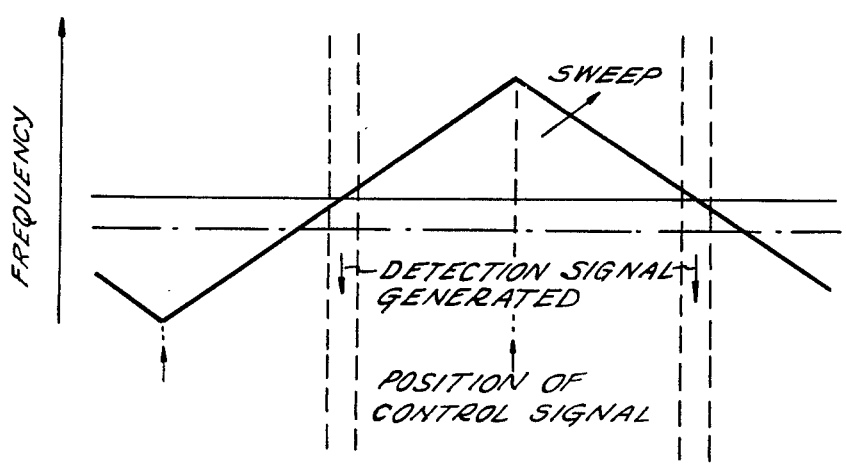

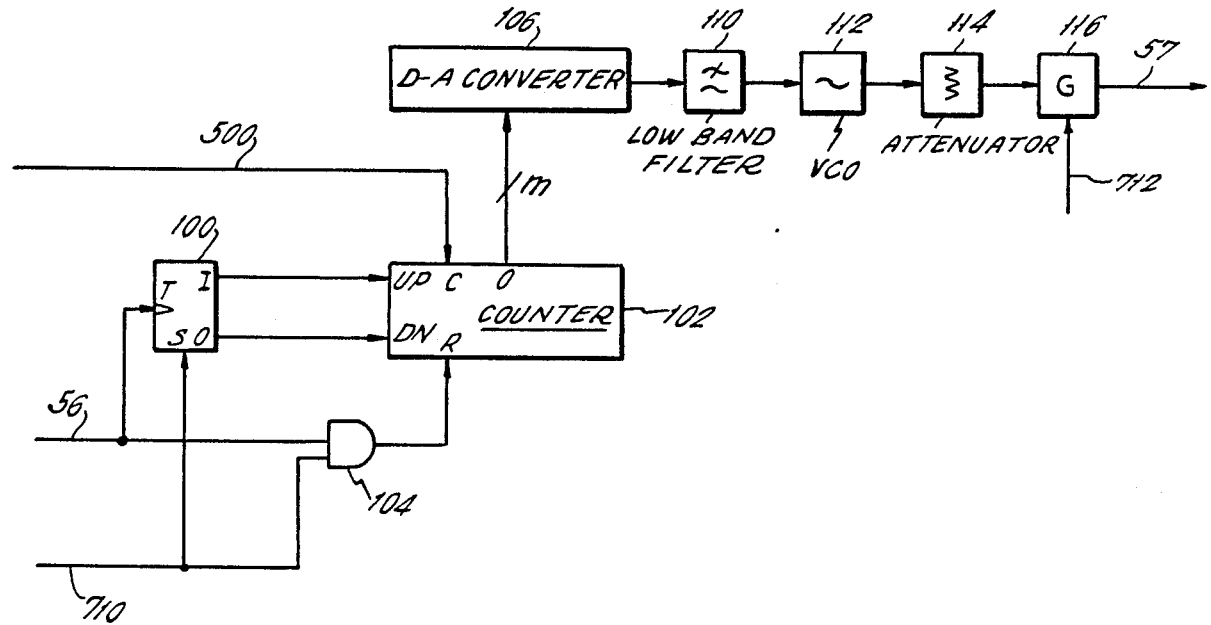
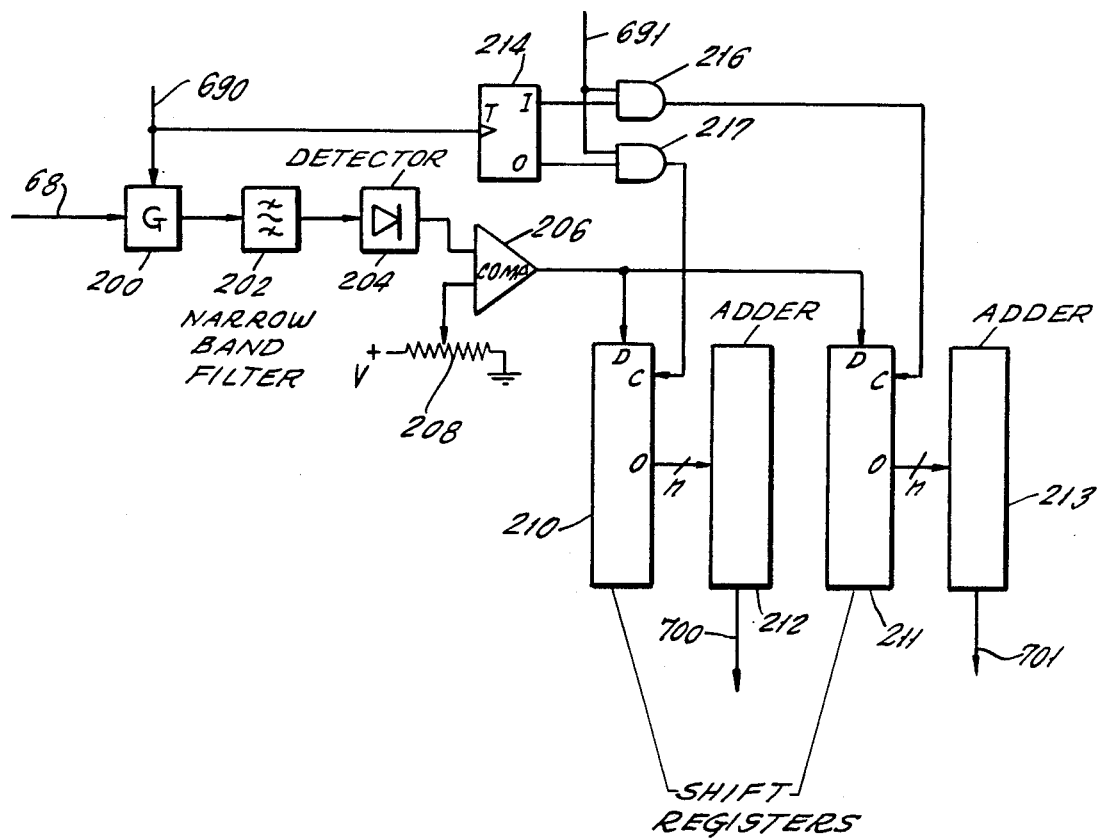

ACQUISITION TECHNIQUE FOR TIME DIVISION MULTIPLE ACCESS COMMUNICATION SYSTEM

BACKGROUND OF THE INVENTION

This invention relates generally to initial acquisition techniques for a time division multiple access (TDMA) communication system and more particularly to those adapted for a TDMA Satellite Communication System employing a stationary type communication satellite.

Multiple access communication techniques enable a plurality of stations to communicate with each other through the intermediary of a relay station common thereto, as widely practiced in the field of satellite communication. Multiple access communications systems have previously been operated by preliminarily allocating different frequencies to the respective stations. This is called a frequency division multiple access (FDMA) communication system.

Recent development of digital techniques has given rise to vigorous attempts to employ TDMA communication techniques instead of FDMA and many experiments in this area are being performed, some of them resulting in practical applications.

In the TDMA communications, signals transmitted from respective stations take the form of an intermittent signal called "burst", which is repeated in regular periods corresponding to those of the TDMA time frame and it is required that such signals be properly synchronized so as not to overlap each other at the relay station to cause interference therebetween. To meet this requirement, a reference burst which includes a synchronizing signal as a reference for the TDMA time frame is transmitted from a reference or master station as selected from the plurality of transmitting-receiving stations participating in the communication system. The burst signals, being transmitted from the respective participant stations, are at all times controlled at the transmitting end so as to be held in a predetermined time-positional relation to the synchronizing signal included in the reference burst. It is to be noted at this point that the so-called initial acquisition technique, with which the present invention is concerned, is a technique for enabling a station, wanting to enter into communication, to insert the station's signal burst in the time slot assigned to the station. The initial acquisition technique is one of the basically important techniques required for TDMA communication systems. Also, it is required that the initial acquisition be obtained with a minimum interference with communications already in progress between other stations.

In this connection, if a station in an initial acquisition attempt can transmit such an access signal as can be received at a substantially high signal-to-noise (S/N) ratio and insert it in the station's assigned time slot, the station's burst transmission can be initiated at any time after any possible error of the access signal in position relative to the synchronizing signal included in a reference burst has been determined and duly corrected.

Accordingly, the present invention particularly relates to techniques for obtaining "rough" transmission timing information in an initial acquisition attempt at its earliest stage in order to enable a transmitting-receiving station to transmit a signal such as to be received at a substantially high S/N ratio and insert such signal in the time slot assigned to the station without allowing it to overlap any of the signal bursts being transmitted by other stations.

Such rough transmission timing information can be easily obtained in cases where the exact distance between the relay and transmitting stations is known but, in cases where the distance varies moment by moment as in the case of satellite communication, complicated means are required just to determine the station distance and techniques effective to overcome this situation are keenly demanded.

In one of the known initial acquisition techniques, a special form of access signal, which is phase-shift-keying (PSK) modulated by a pseudorandom noise (PN) or other special digital signal train, is continuously transmitted at a power lever about 20 dB below the normal signal level, and the positional relationship between the signal train as received and demodulated and the synchronizing signal included in the reference burst, is determined in order to obtain the transmission timing information required.

In another known initial acquisition method, undulated carrier wave pulses of low power level are transmitted and such pulses are manually or automatically swept within the TDMA time frame in order to detect when they are positioned in the assigned time slot.

These well-known techniques are highly efficient since the communication for initial acquisition can be executed in the same frequency band as used in normal communication. However, the S/N ratio of the received access signal is extremely low because of the limited power transmission of the signal. To overcome this situation, the bit width of the PN train or the pulse width of the unmodulated carrier wave has previously been made much larger than the bit width of normal communication signals. For reception of such signal, a narrow-band band-pass filter (BPF) has been employed so that the signal may be demodulated at an improved S/N ratio.

On the other hand, it is supposed that the received signal frequency fluctuates due to a number of different factors. Namely, more or less frequency deviation may result from the arrangement of components such as a carrier wave oscillator and a local oscillator for frequency conversion from IF to RF in the transmitter, a local oscillator in the relay station, and a local oscillator used in the receiver for frequency conversion from RF to IF, and also under the Doppler effect upon signal transmission, which arises with variation in distance between the operating and relay stations.

In a typical example of satellite communication systems employing a 6 GHz/4 GHz band, the frequency deviation has been of the order of several tens of KHz, but it is expected to increase in the future as the frequency band employed is expanded to 10 GHz or over.

Under these circumstances, in order that the previous initial acquisition techniques employing a narrow-band BPF may be utilized satisfactorily, it has been necessary to additionally employ an AFC (automatic frequency control) means to enable the access signal received to pass through the narrow-band BPF and this would not only make the installation complicated as a whole, but also increase the length of time required for each initial acquisition.

BRIEF DESCRIPTION OF THE INVENTION

Accordingly, an object of the present invention is to provide an improved initial acquisition technique which overcomes previous difficulties such as those described above and can be carried out without necessitating any complicated installation.

To attain this object, the present invention proposes to employ for initial acquisition a signal whose frequency varies cyclically in periods definitely related to those of the TDMA time frame and, transmitting such access signal to a relay station such as a communication satellite and receiving the signal as relayed back therefrom, detecting when the varying frequency of the access signal received coincides with a predetermined frequency value or passes through a predetermined frequency band.

According to the technique of the present invention, as the frequency of the access signal is swept over a predetermined range, the signal can be received and detected accurately for initial acquisition without necessitating the use of any AFC means even if the central frequency of the wave received be deviated, as described above, on account of different factors. Actually, however, any deviation of the central frequency of the wave received results in some error involved in the transmission timing information obtained and the error can be corrected effectively by such means as will be described later by way of example.

The above and other objects, features and advantages of the present invention will become more apparent from the following description taken in conjunction with the accompanying drawings, which illustrate a few preferred embodiments of the invention.

BRIEF DESCRIPTION OF THE DRAWINGS

FIGS. 4A–4C and 5A–5C show waveforms which serve to illustrate the operating principle of the present invention;

FIG. 6 is a block diagram of the access signal detecting means usable in the present invention;

FIGS. 7A and 7B are block diagrams illustrating alternative embodiments of the associated part of the transmission synchronizing means usable in the present invention;

FIGS. 8A and 8B are diagrams illustrating a timing error resulting from a frequency deviation;

FIGS. 9A–9C are diagrams illustrating the process in which the error due to frequency deviation is eliminated according to the present invention; FIG. 10 is a block diagram illustrating one preferred form of access signal generating means usable to carry out the process of error correction shown in FIGS. 9A–9C;

FIG. 11 illustrates a preferred form of access signal detecting means usable in the process of error correction shown in FIG. 9.

DESCRIPTION OF THE PREFERRED EMBODIMENTS

Figure 1:
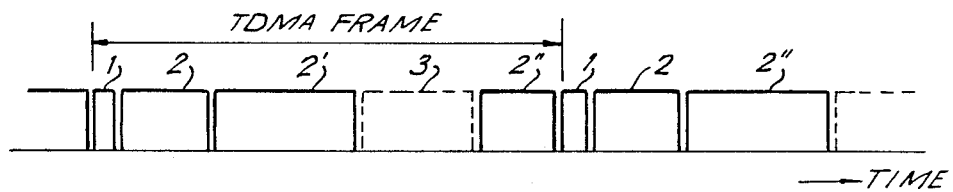
FIG. 1 is a schematic diagram illustrating a frame format for the TDMA communication.

Referring first to FIG. 1, the TDMA frame format illustrated therein includes a time arrangement of signals transmitted from respective transmitting-receiving stations to a relay station and such signal arrangement is repeated once for each TDMA frame.

As referred to before, the signals transmitted from respective stations are intermittent signals called "bursts" and must be properly synchronized with each other so as not to overlap each other at the relay station so that any interference therebetween may be avoided.

Again, in FIG. 1, reference number 1 indicates a reference burst which includes a synchronizing signal as a reference to the TDMA time frame and is transmitted from a station selected from operating stations in the communication system as a reference or master station.

Reference numerals 2, 2', 2'' . . . indicate respective signals of burst form being transmitted from the participant stations and controlled at the transmitting end so as to be held at all times is predetermined positional relation to the synchronizing signal included in the reference burst 1. Reference numeral 3 indicates a time slot assigned to a station which is not yet in communication with any other station.

Figure 2A:
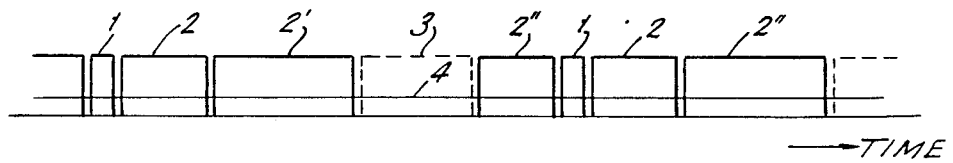
FIGS. 2A and 2B are frame diagrams explaining respective conventional initial acquisition techniques.
Figure 2B:
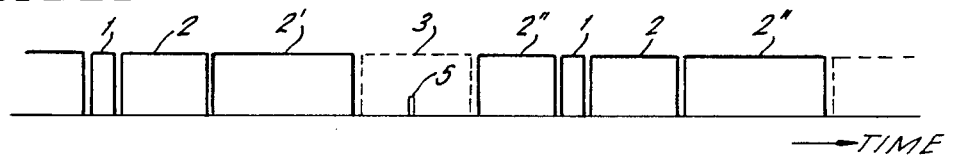

FIGS. 2A and 2B schematically illustrated two conventinal initial acquisition techniques, wherein like reference numerals 1, 2, 3 used as in FIG. 1 designate like frame portions. In FIG. 2A, reference numeral 4 indicates a special access signal which is continuously transmitted at a level of about 20 dB below the normal signal level. The access signal may, for example, be a signal PSK-modulated by a PN or other special digital signal train. In order to obtain the desired transmission timing information from the modulated signal, the phase relationship between the received and demodulated signal train and the synchronizing signal referred to above are determined.

In the method shown in FIG. 2B, unmodulated carrier wave pulses 5 of relatively low power are transmitted and swept manually or automatically over the TDMA time frame to determine when they are placed in the station's assigned time slot.

As pointed out hereinbefore, these methods of initial acquisition are high in efficiency since the communication for initial acquisition can be executed in the same frequency band as used in normal communication. However, the S/N ratio of the received access signal is extremely low because of the limited power transmission of the access signal. To cope with this situation, the width of each bit of the PN train or the pulse width of the unmodulated carrier wave has previously been made much larger than the bit width of normal communication signals. For reception of such signal, a narrowband BPF has been employed to improve the S/N ratio of the signal demodulated.

In these previous methods, however, AFC means must be added to deal with frequency deviation derived from local oscillators and the Doppler effect, and this technique creates disadvantages such as complexity in system structure and a substantial increase in the time required for initial acquisition, as was pointed out hereinabove.

Description will next be made in detail of the apparatus for initial acquisition according to the present invention. First, the structure and operation of a typical TDMA communication station will be briefly described with reference to the block diagram of FIG. 3, in which the double-frame blocks represent those station components which are particularly concerned with the initial acquisition technique of the present invention.

Figure 3:
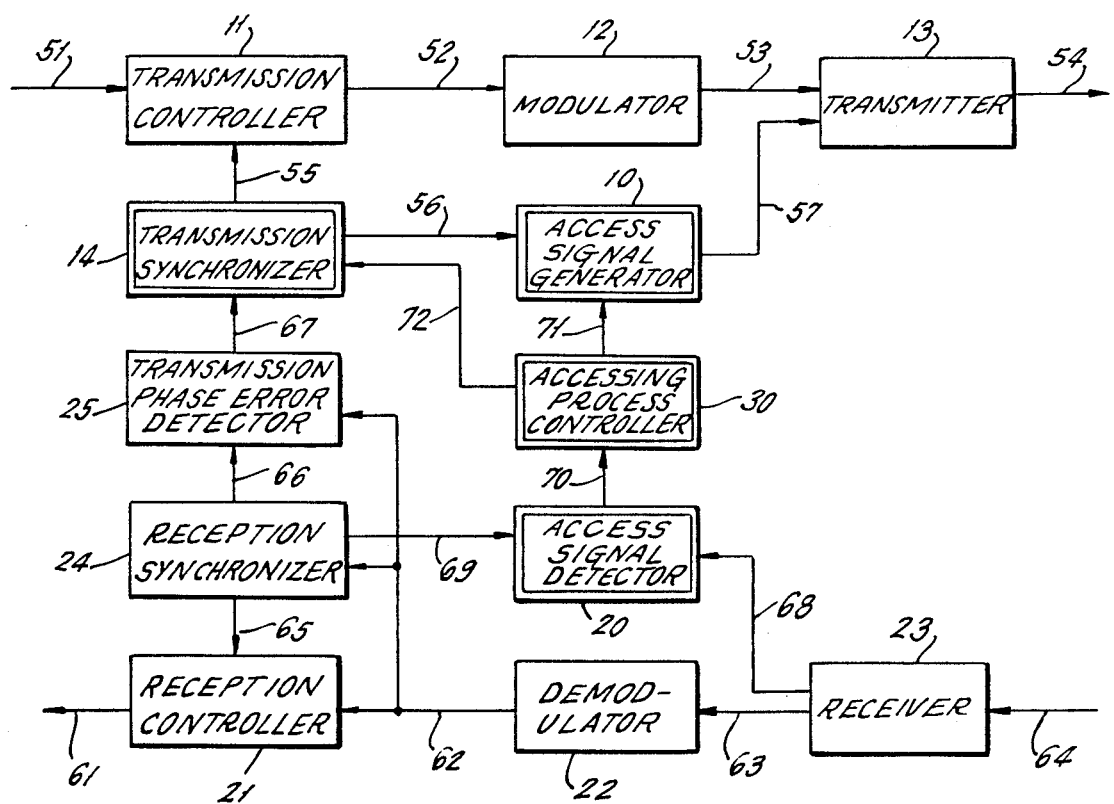
FIG. 3 is a block diagram illustrating a typical arrangement and construction of the transmitting-receiving station apparatus usable in a TDMA communication system.

In FIG. 3, reference numeral 10 represents an access signal generator; 11, a transmission controller; 12, a modulator; 13, a transmitter; 14, a transmission synchronizer; 20, an access signal detector; 21, a reception controller; 22, a demodulator; 23, a receiver; 24, a reception synchronizer; 25, a transmission phase error detector; and 30, an initial accessing process controller.

A signal to be transmitted, 51, such as a voice signal, is fed to the transmission controller 11 for PCM coding, multiplexing, insertion of a synchronizing signal, scrambling, etc., to obtain a high-speed digital burst signal 52 as an output therefrom. The signal 52 is fed to the modulator 12, usually of the PSK type. The modulator output 53 is fed to the transmitter 13, frequency-converted into RF and then amplified by an output amplifier to form a transmitter output 54. The output 54 is sent to the relay station.

The transmission output signal is received and relayed back by the relay station and is applied to the receiver 23 as an input 64 thereto, and undergoes amplification through a low noise amplifier whereupon a frequency converter converts the signal from RF to IF in the receiver 23. The IF signal 63 appearing at the output of receiver 23 is applied to demodulator 22, where it is demodulated into a high-speed digital signal 62 by synchronization detection or a like method. The demodulator output or high-speed digital signal output 62 is fed to reception controller 21 for descrambling, separation, decoding, etc. and is thus restored to a voice or other original form of signal to be distributed as a reception output 61.

The digital demodulator output signal 62 is also applied to reception synchronizer 24, in which the synchronizing signal in the reference burst transmitted from the master station is extracted and employed to synchronize a reception frame counter which is incorporated in the reception synchronizer 24. In this manner, reception frame synchronism is established and frame pulses 65 produced by the reception frame counter are employed to control various operations of the reception controller 21.

The reception synchronizer 24 also serves to form a reception position predicting signal 66 for the signal transmitted by the accessing station by utilizing the reception frame counter referred to above. The transmission phase error detector 25, together with the transmission synchronizer 14, constitutes circuitry commonly referred to as a burst synchronizer. The transmission phase error detector 25 extracts from the demodulated digital signal 62 the synchronizing signal in the station's transmission burst for comparison with the position prediction signal 66 to determine the error in phase of transmission. The transmission synchronizer 14, incorporating basic components for transmission, such as a clock signal generator and a frame counter, forms transmission frame pulses 55, which are fed to transmission controller 11 to control operation thereof, and, on the other hand, utilizing the transmission phase error information 67 as obtained in phase error detector 25, serves to control the phase in which transmission frame pulses 55 are generated to thereby continuously minimize the transmission phase error.

The arrangement of station components described above suffices as far as normal station operation is concerned, but some further means are required in order to serve the purpose of initial acquisition.

Referring still to FIG. 3, the access signal generator 10 generates an initial access control signal 57 in accordance with an access control signal 56 produced by the transmission synchronizer 14 in synchronism with the transmission frame counter incorporated therein and, according to the present invention, frequency variation of the access signal is controlled by the control signal 56. The access signal 57 is transmitted from the transmitter 13 to the relay station.

The access signal relayed back from the relay station is received by the receiver 23 and fed therefrom to the access signal detector 20 as a reception signal 68 together with other signals. The detector 20 selects, out of the reception signal, only the access signal portion thereof, i.e., that portion of the reception signal assigned to the station's time slot excluding all signals from other stations, by utilizing an initial access position indicating signal 69 from the reception synchronizer 24. The detector 20, monitoring the access signal in this manner, delivers the result of such signal observation to the initial accessing process control 30 as an access signal detection signal 70.

The process controller 30 is designed to control operations of the access signal generator 10 and transmission synchronizer 14 in accordance with a predetermined program and with the state of the detection signal 70 by respectively feeding them with a transmission mode controlling signal 71 and an initial mode controlling signal 72.

The principles of the present invention will next be explained with reference to FIGS. 4A–4C. At A in FIG. 4A, the waveform of initial access position indicating signal 69 is illustrated, which is a gate signal of width W. The signal width W may be chosen to be equal to the width of the station's assigned time slot but is made for safety equal to a minimum expected width, which is typically of the order of 10 microseconds.

Illustrated in FIG. 4B is the time relationship between the access signal variation in frequency and the filter band of width B centered at the reception central frequency. The width B is determined by the S/N ratio required by the detector 20 and the rise time shown in FIG. 4C as "detecting time T" and is typically set at 500 KHz or under.

The access signal frequency sweeping speed $f'$ is preferably so selected that the time required for the frequency to pass over the filter band width B is longer than the detecting time T and at most approximately equal to the width W of position indicating signal 69. Accordingly, it is contemplated to set the value of $f'$, for example, at $1 \times 10^{11}$ Hz/sec in practical applications.

Conversely, it is to be noted that, with the sweeping speed selected in the manner described above, use of the filter of band width B makes it possible to detect when the access signal frequency passes across the reception central frequency at the location of the position indicating signal.

Figure 5A:
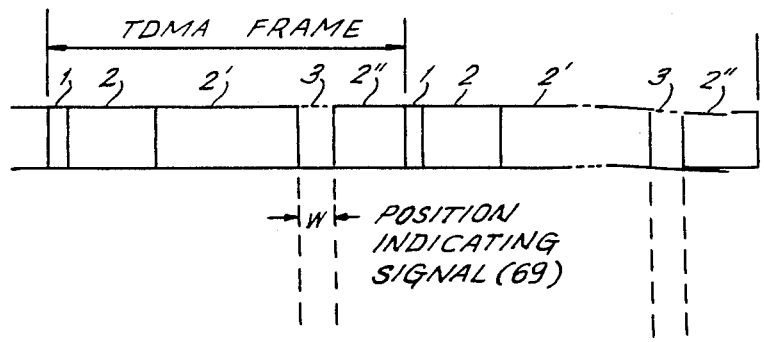
Figure 5B:
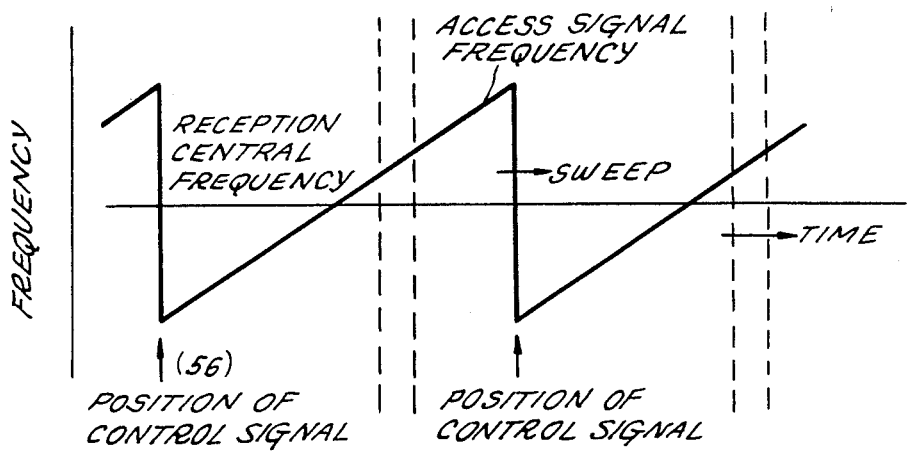
Figure 5C:
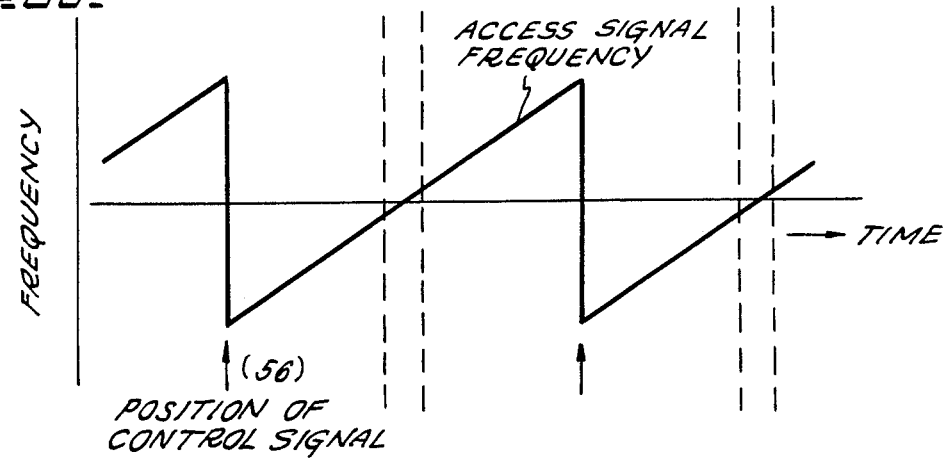

Reference will next be made to FIGS. 5A–5C, which illustrate the basic scheme of utilizing the principles described above for initial acquisition according to the present invention.

For the sake of simplicity, it is first assumed that there is no frequency deviation in the received wave. Illustrated in FIG. 5A is a TDMA frame format which is similar to that shown in FIG. 1 and, as shown, includes a reference burst 1, signal bursts 2, 2' and 2'', and an empty time slot 3 assigned to the station desiring to enter into communication. The width of the empty time slot 3 is at least larger than the width W of position indicating signal 69. The access signal generator 10 generates, in synchronism with the control signal 56 from transmission synchronizer 14, an access signal whose frequency varies cyclically in periods related to those of the TDMA time frame in a definite manner, and for example, varies in a sawtooth form as illustrated in FIG. 5B. The transmission power of the access signal transmitted from the transmitting apparatus 13 should be 20 dB or thereabout below the level for normal signal transmission as long as the same frequency band is employed both for the access signal and normal communication signals.

The access signal relayed back and received by receiver 23 is effectively detected only when its frequency coincides with the central frequency of the reception signal in the position W of position indicating signal 69. Accordingly, in the case of FIG. 5B, the sawtooth wave of access signal frequency is swept over the TDMA frame by displacing the control signal 56 in phase relative to the TDMA frame while observing the position of the frequency wave within the width W of position indicating signal 69. In this manner, it is detected when the frequency of the access signal comes into coincidence with the reception central frequency within W, as illustrated in FIG. 5C, and the position of control signal 56 relative to the TDMA frame at the time can serve as a measure for obtaining the desired transmission timing information. Incidentally, it is also contemplated that any other station can receive the access signal relayed back and detects the frequency coincidence thereof with the reception central frequency.

In general, however, the S/N ratio of the signal as detected through a narrow-band filter is considerably low and, in many cases, the possibility of misdetection is substantial. Because of this, it will be generally required that the detection be performed on a kind of decision-by-majority basis.

FIG. 6 illustrates a preferred form of access signal detector 20 having such function of deciding by majority. In this figure, reference numeral 200 indicates a gate circuit which cuts out (i.e., forms an observation "window" for) the reception signal 68 in width W under the control access position indicating signal 690; 202, a narrow-band filter of band width B; 204; a detector unit; 206, a comparator for deciding whether the detector output is larger or smaller than a threshold potential as determined by a potentiometer 208; and 210, an $n$-stage shift register into which the comparator output is led by means of a write-in signal 691. The signal 691 is generated in proper time relation to the position indicating signal 690 and is so positioned as to make the comparator output optimal with due regard to associated factors such as the delay time in rise due to use of the narrow-band filter 202.

Reference numeral 212 indicates an adder which counts the number of states in the $n$-stage shift register. For example, it is assumed that the output state of comparator 206 becomes 1 when the access signal has been detected. Then, an access signal detection signal 70 is generated and transmitted to the accessing process controller 30 when it is found that, in the $n$-stage shift register ($n$=20, for example), 16 or more stages thereof include 1. In this instance, it will be noted that the judgement is made on the majority basis, allowing misdetection to occur four times in each succession of 20 TDMA frames, and thus the danger of misjudgement is effectively avoided.

As for the rate at which the sawtooth wave of access signal frequency is swept over the TDMA frames, it should be rather low for detection means but rather high for practical applications. Acutally, however, the value is selected such that the width (W-T) is swept in a period of at least $n$ frame times and further such that the entire length of a TDMA time frame is completely swept over in a length of time of from 1 to 10 seconds. In cases where a stationary satellite is used as a relay station, it takes 0.26 seconds or more for the signal to travel from the earth station to the satellite and back therefrom to the earth station as the distance between the earth and satellite stations is 36,000 Km or over. Accordingly, in cases where the rate is high, the transmission control signal will be in a position advanced by 0.26 seconds or greater at the instant when the access signal is detected on the receiver side and any true information cannot be obtained unless correction is made for the amount of such advance of the control signal.

Figure 7B:
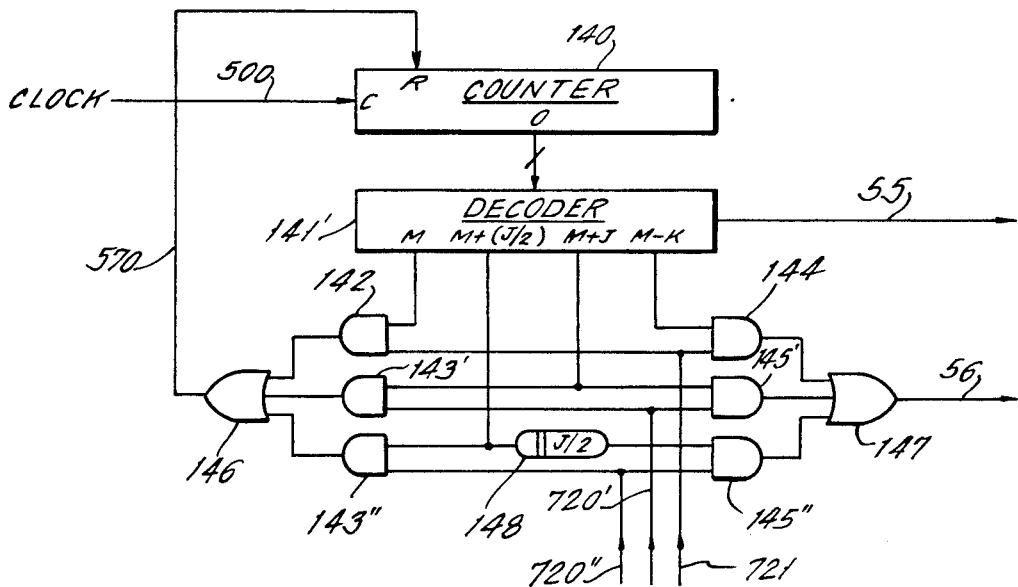

FIGS. 7A and 7B each illustrate a portion of the transmission synchronizer 14 (FIG. 3) which is designed to effect such correction following the sweeping and detecting process. In FIG. 7A, reference numberal 140 indicates an L-stage binary counter; and 141, a decoder for decoding the counter contents which normally decodes a number, M, of bits, corresponding to one TDMA frame length, to produce a reset pulse 570 (through gates 142 and 146), which is fed to the reset input R of counter 140 to reset the counter. In this manner, since the counter 140 operates as a radix-M counter, the decoder 141 produces transmission frame pulses 55 serving to control transmission of signal bursts. The decoder 141 also decodes (M + J) and (M − K), as indicated in FIG. 7. Here, $M + J \leq 2^L$. A sweep mode indicating signal 720 and a normal mode indicating signal 721 are fed from the accessing process control 30 to selectively operate AND gates 142–145 and OR gates 146 and 147 in the following manner. Namely, when the sweep mode indicating signal 720 is in the binary 1 state, the (M + J) output of decoder 141 is utilized as reset pulse 570 for L-stage counter 140 (through gates 143 and 146) and also as control signal 56 for signal generator 10 (through gates 145 and 147). As a consequence, the circuit 140 of FIG. 7A operates as a radix-(M + J) counter and the time position at which control signal 56 is generated is retarded J bits for each TDMA frame so that the sweep operation described above is realized. Upon generation of the detection signal 70 of the detector 20, the state of the sweep mode indicating signal 720 from accessing process control 30 changes to 0 while at the same time the normal mode indicating signal 721 therefrom is changed into the 1 state. As a result, the M output of decoder 141 is employed to produce reset signal 570 and thus the circuit 140 of FIG. 7A operates as a radix-M counter, that is, as a frame counter, while for the production of control signal 56 the (M-K) output of the decoder is employed. The value of K corresponds to a sweeping time of approximately 0.26 seconds, i.e., to J (number of TDMA frames for the time of 0.26 seconds), which is a value calculated or measured in advance in respective stations. With this arrangement, it will be apparent that correction of the transmission timing information is completed.

Next, description will be made of the measures resorted to according to another feature of the present invention under the existance of a frequency deviation.

FIG. 8 is a diagram explaining an error resulting from a frequency deviation and at A illustrates the state of the access signal being detected within W wherein there is no frequency deviation, while illustrating at B the occurrence of an error E under the presence of a frequency deviation $\Delta f$. As will readily be noted, the magnitude of such errror E increases proportionally to the frequency deviation $\Delta f$. In this connection, the range or width of signal frequency variation must be sufficiently large for the magnitude of frequency deviation $\Delta f$.

FIG. 9 illustrates waveforms useful in describing an embodiment of the present invention designed for elimination of such error E. As illustrated in FIG. 9A, the waveform of access signal frequency in this case is not sawtoothed but is made to vary in accordance with a triangular waveshape in order that the rise (increase in frequency) and fall (decrease in frequency) of the triangular waveform may be controlled by means of control signal 56. In this case, where the triangular frequency wave sweeps over the TDMA frame, the conditions for the signal to be detected within W along the rising side of the frequency wave differ from those for the falling side thereof, and the difference in time of signal detection is available for correction of error E.

In FIGS. 9B and 9C, there are illustrated two different examples of signal detection. In the method utilizing the waveforms of FIG. 9B, even if the signal is first detected in the region of frequency rise, the sweeping is continued until it comes to stop when the signal is again detected in the region of frequency fall. Obviously, the order of detection may be reversed in accordance with the condition present. In either case, a correct detecting position is determined at a value intermediate the two times of detection. In practical applications, it can be determined by counting up the time spacing between the first and second positions of signal detection in transmission synchronizer 14 to determine the middle point between the two positions of detection to thereby obtain a correction value which corresponds to the quantity K previously referred to. When it is warranted that the time spacing between the two positions of detection is relatively small, that is, shorter than 0.26 seconds, resort may be had to a simpler circuit as shown in FIG. 7B. FIG. 7B illustrates a portion of the transmission synchronizer 14 (FIG. 3), whose operation is similar to that of FIG. 7A. In FIG. 7B, reference numeral 141' indicates a decoder for providing an (M+(J/2)) output at the decoder 141 shown in FIG. 7A; 143', 143'', 145' and 145'', AND gates; 148, (J/2) bit delay means; and 720' and 720'', sweep mode indicating signals. The other like reference numerals denote like structural elements shown in FIG. 7A. During the sweep mode, the sweep mode, the sweep mode indicating signal 720' turns to 1 first. The radix-(M+J) counter is then supplied with the (M+J) decoder output as a reset signal for sweeping at the rate of J bits per frame. Upon the first signal detection, the sweep mode indicating signal 720'' turns to 1 to reduce by half the sweeping rate with the (M+(J/2)) decoder output used as a reset signal. In this case, the delay means 148 serves as a compensating circuit to prevent the discontinuity of the triangular frequency wave at the point of the sweep mode change. Upon the second signal detection, the M decoder output is used as a reset signal to stop the sweep while at the same time the (M+K) output is employed as a control signal.

In another method represented by the waveforms shown in FIG. 9C, the frame is first swept over by a sawtooth wave in the same manner as previously described with reference to FIG. 5 and, once K-bit correction has been made upon signal detection within W, the wave is replaced by a triangular wave such as shown in FIG. 9C, and only one side of the triangular waveform is used to sweep the frame with the other wave side held fixed.

FIG. 10 illustrates one preferred form of access signal generator 10 adapted to realize the principles of FIGS. 9A-9C. Reference numeral 102 indicates an $m$-stage up-down (or add-subtract) counter arranged to be driven by a clock signal 500. As long as the mode control signal 710 from accessing process control 30 is in the 1 state, the counter 102 is reset periodically once in each TDMA frame time by the control signal 56 from transmission synchronizer 14, which is passed through AND gate 104 to the counter, and thus the counter 102 serves as a radix-(M+J) add counter. The output of counter 102 is fed to a D/A converter 106 and shaped into a stepped sawtooth wave. The converter output is further shaped into a smooth-sided sawtooth form by a low band filter 110 and is then used to control the oscillation frequency of a VCO (voltage control oscillator) 112. The VCO output is adjusted in magnitude by an attenuator 114 and then fed to the transmitter 13 (FIG. 3). Normally, however, when there is no accessing process going on, the generator output is held cut off by an output ON/OFF switch 116 responsive to the mode control signal 712 fed thereto from the process control 30 (FIG. 3).

When a triangular frequency waveform is desired the mode control signal 710 is turned to 0 so that the control signal 56 from transmission synchronizer 14 drives a flip-flop 100 thereby to change the mode of operation of add-subtract counter 102 from "add" to "subtract" or vice versa, once for each TDMA frame.

In order to sweep only one of the two sloped sides of the triangular wave formed in the manner described, the decoder circuit need only be controlled so that the M and (M + J) outputs of decoder 141 (FIG. 7A) are alternately employed as a reset signal 570 to the frame counter 140 in the transmission synchronizer 14.

As previously described, in cases where a triangular frequency wave such as shown in FIGS. 9A-9C is employed for sweeping, detection of the access signal within W is made, due to the frequency deviation of the wave received, alternately at two locations, each recurring every other TDMA frame.

One preferred form of access signal detector means 20 adapted for use under such condition is illustrated in FIG. 11 and description will be made here only of its differences as compared with the embodiment of FIG. 6.

In FIG. 11, the access position indicating signal 690 is employed to selectively turn on and off a gate circuit 200 and also to drive a flip-flop 214. AND gates 216 and 217 are provided to distribute the write-in-signal 691 into two circuits alternately for every other TDMA frame. In this manner, the output from the comparator 206 is alternately written into two $n$-stage shift registers 210 and 211. Reference numerals 212 and 213 respectively indicate two adders provided to determine the contents of shift registers 210 and 211 on a majority basis and being capable of producing detection display signals 700 and 701 independently of each other when the conditions for judgment are satisfied.

Figure 12A:
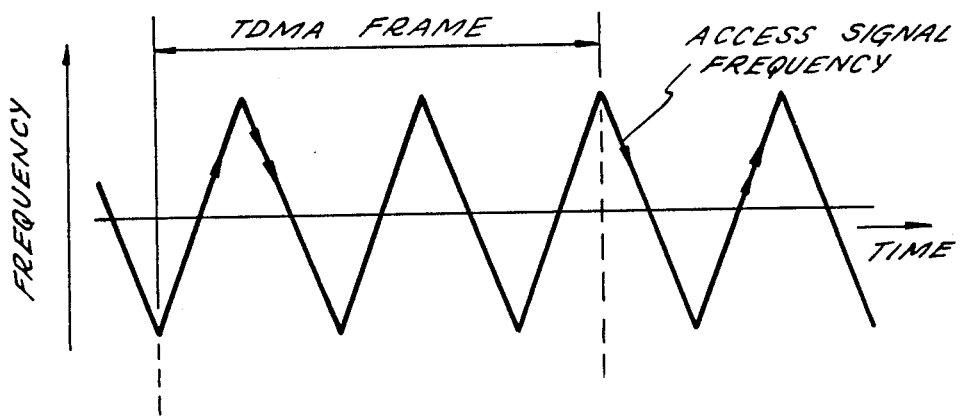
FIGS. 12A–12C show diagrams which illustrate a modification of the process of error correction shown in FIGS. 9A–9C.
Figure 12B:
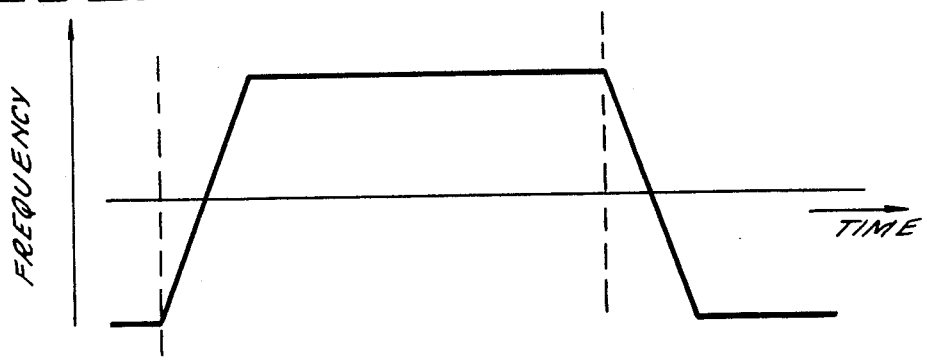
Figure 12C:
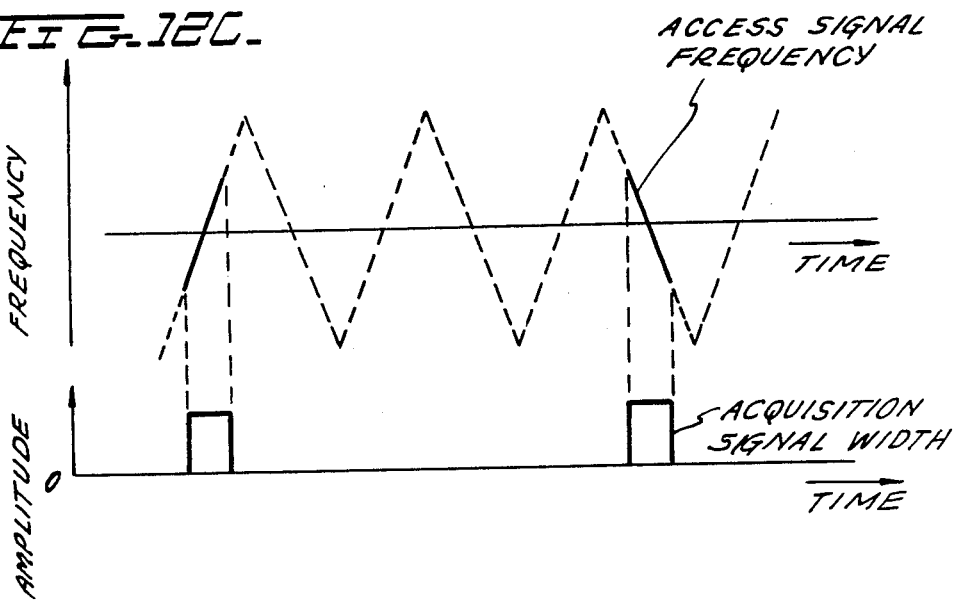

FIGS. 12A-12C illustrate a modification of the technique of FIGS. 9A-9C in which a triangular frequency wave of the same length of cycle time as the TDMA frame is employed and the angle of inclination of such wave or the speed of frequency sweep, $f'$, is principally determined independently of the length of frame period, it may happen with a single triangular wave that the frequency variation is either too large or too small in amplitude. In such cases, it may be required that the access frequency be varied to have a plurality of triangular wave lengths within each TDMA frame, as illustrated in FIG. 12A, or a single triangular wave length extending over a plurality of successive TDMA frames. With the case shown in FIG. 12A, a definite number, P + ½ of triangular waves are included within each TDMA frame to deal with the problem of frequency deviation of the received signal wave according to the present invention. P represents zero or a positive real integer with this arrangement. It will be observed that the inclination of the frequency wave is reversed once for each TDMA frame and the varying access signal frequency coincides with the reception central frequency at a plurality of points within a single length of TDMA frame, thus giving more or less indeterminateness in judgement. To overcome this disadvantage, it is desirable to employ a frequency waveform which provides only a single point of coincidence within each TDMA frame, as illustrated in FIG. 12B. Also, it will be readily understood that substantially the same result can be obtained even with use of the waveform illustrated in FIG. 12A by transmitting only the requisite wave portions chopped out as shown in FIG. 12C. Further, if the sloped portions of the frequency waveform which are actually utilized constitute only a limited part of the waveform, it is also contemplated to employ a sinusoidal waveform in place of triangular waves such as illustrated in FIGS. 9A–9C and 12A–12C.

To summarize, the situation can be met with successful results by varying the access signal frequency periodically in such a waveform that a definite number, P +½, of frequency wave lengths are included in each set of Q TDMA frames (Q being a real integer equal to or greater than 1) and selecting one out of a number of points of coincidence within each set of Q TDMA frames (where Q>1 and Q=2, 3. . . q) at which the access signal frequency coincides with the reception central frequency in order to utilize as an access signal only the region neighboring the point of coincidence selected. In regions other than this, the access signal frequency is held at a level such that no coincidence takes place with the reception central frequency or alternatively, the access signal itself is interrupted so as not to be transmitted.

In the foregoing description, the term "reception central frequency" has only been employed in connection with the reception of the access signal and is not necessarily required to be equal to the central frequency of normal communication. For minimizing any possible interference, it is rather desirable to set the reception central frequency to be more or less shifted from the central of normal communication. Where a plurality of relay units are included in a single relay station as is usually the case with communication satellites, it is possible to utilize different relay units to relay the normal communication and the access signal, respectively. To obtain the results desired, however, it is necessary to pay due regard to the difference in delay time between the two relay units, and in some cases more or less error may remain uncorrected.

Also, for actual initial acquisition, the state of reception synchronization and that of the accessing station itself must be checked prior to starting the accessing operation. Further, there are a number of operation steps left to be performed after the desired, relatively rough, transmission timing information has been obtained according to the present invention, including the steps of transmitting a special signal of normal power in accordance with the information obtained and determining the transmission timing more precisely. These steps of operation are performed by means of the accessing process controlling apparatus 30 but description of any further details of the apparatus is omitted here as such details form no part of the present invention.

As will be apparent from the foregoing description, the initial acquisition technique of the present invention provides simple means of serving the intended purpose without necessitating addition of any particular AFC function even in a communication system which involves a substantial frequency deviation of the signal received. This also enables simplification of equipment used for solving problems such as frequency stability of the transmission oscillator means and instability of the receiver circuit due to temperature variation. It will readily be appreciated that the present invention is applicable to a wide variety of communication fields including satellite communication systems and mobile radio communications such as are used between marine vessels, automotive vehicles or the like.

What is claimed is:

1. Apparatus for initially accessing a relay station in a time division multiple access (TDMA) communication system in which a plurality of transmitting-receiving stations communicate with each other through the relay station and in which a transmitting-receiving station wanting to enter into communication transmits an access signal to the relay station and, receiving the access signal as relayed back therefrom, determines the position of the access signal within the time frame of the TDMA communication system so that information signals from the transmitting-receiving station may be inserted in the time slot assigned thereto for time division channel connection, said apparatus being characterized in that the transmitting-receiving station is provided with:

means for generating a signal the frequency of which varies cyclically in periods each being related to those of the time frame of the TDMA communication system and transmitting such signal as an access signal to the relay station.

2. An apparatus for initially accessing a relay station in a time division multiple access (TDMA) communication system in which a plurality of transmitting-receiving stations communicate with each other through the relay station and in which a transmitting-receiving station wanting to enter into communication transmits an access signal to the relay station and, receiving the access signal as relayed back therefrom, determines the position of the access signal within the time frame of the TDMA communication system so that information signals from the transmitting-receiving station may be inserted in the time slot assigned thereto for time division channel connection, said apparatus being characterized in that it is provided in the transmitting-receiving station with:

means for receiving the access signal in the form of a signal whose frequency varies cyclically in periods with each frequency values having a definite relationship to each period of the time frame of the TDMA communication system, and:

means for detecting when the frequency of the received access signal is at a predetermined value or within a predetermined band.

3. An apparatus for initially accessing a relay station in a time division multiple access (TDMA) communication system in which a plurality of transmitting-receiving stations communicate with each other through the relay station and in which a transmitting-receiving station wanting to enter into communication transmits an access signal to the relay station, and receiving the access signal as relayed back therefrom, determines the position of the access signal within the time frame of the TDMA communication system so that information signals from the transmitting-receiving station may be inserted in the time slot assigned thereto for time division channel connection, said apparatus being characterized in that it is employed in the transmitting-receiving station and comprises:

means for transmitting a signal whose frequency varies cyclically in periods definitely related to periods of the time frame of the TDMA communication system as an access signal to the relay station, and means for detecting when the frequency of the received access signal is at a predetermined value or within a predetermined band.

4. Apparatus for use in transmitter-receiver stations of a system in which such stations communicate with one another by means of a relay station, wherein each transmitter-receiver station is assigned a time slot, each slot being arranged in a frame and positioned a predetermined time interval away from a reference or starting signal marking the beginning of each such frame said frames being repeated in a regular fashion, the transmitter-receiver stations having means for gaining initial access into the communication system comprising:

first means for transmitting a control signal which varies in frequency over the interval of said frame;

means for receiving the control signal relayed to the transmitter-receiver station by the relay station;

means for generating an access position indicating signal to identify the time slot assigned to the transmitter-receiver station attempting to gain access to the system;

means responsive to said relayed signal and said access signal for testing the accuracy of said position indicating signal including means for detecting the frequency of the relayed signal only during the interval of the access position indicating signal to determine if the frequency associated with the transmitter-receiver station initiating access is present during said interval.

5. The apparatus of claim 4, wherein said testing means comprises:

band-pass filter means for passing said associated frequency;

gate means responsive to said access signal for coupling said received relay signal to said filter means;

comparator means for generating a compare output signal when the signal passed by said filter means reaches a predetermined threshold.

6. The apparatus of claim 5 further comprising n-stage shift register means for receiving and storing compare output signals;

means for shifting the compare signals stored in said shift register means during each frame;

counter means coupled to said shift register means for generating an output when the number $m$ of compare signals stored in said shift register is given by $m \geq m-k$ where $m, m+k$ are real integers, $m>k$ and $m-k>m/2$.

7. The apparatus of claim 4 further comprising means for generating a trigger signal for initiating the generation of an access signal and including means for adjusting the time relationship of said access signal relative to the control signal relayed from the relay station to compensate for the time required for the control signal to travel from the transmitter-receiver station to the relay station and back.

8. The apparatus of claim 4 comprising means for operating said means for generating said control signal to vary the frequency in accordance with a triangular shape waveform so that upon the initiation of every other frame the frequency is increased from a minimum value towards a maximum value and upon the initiation of intervening frames the frequency is lowered from the maximum value towards said minimum value.

9. The apparatus of claim 5 further comprising first and second $m$-stage shift register means for receiving and storing compare output signals of alternate frames;

means for shifting the compare signals stored in each of said shift register means during each frame;

first and second counter means coupled to an associated one of said shift register means for generating an output when the number $m$ of compare signals stored in said shift register is given by $m \geq m-k$ where $m, m+k$ are real integers, $m>k$ and $m-k>m/2$.

10. The apparatus of claim 4, wherein said first means further comprises means for varying the frequency between a minimum and a maximum value an odd number of times during a frame so that the direction of change of frequency in the intervals during which the testing means is rendered operative is reversed during each succeeding frame.

11. The apparatus of claim 10 further comprising means for deactivating the frequency sweep during all but the first frequency sweep of a frame.

12. A method for enabling a transmit-receive (T/R) station to enter into communication with other T/R stations in the system whereby the stations communicate with one another by transmitting their information to other stations by way of a relay station wherein information is transmitted to the relay station only during a time slot assigned to each station each such time slot occurring once during a time frame which is comprised of a plurality of slots, one for each station, each station time slot occurring at the same position in succeeding frames, the method comprising the steps of:

a. generating a control signal which varies its frequency between an upper and a lower limit over an interval approximately equal in length to a frame, said sweep including a frequency assigned to the station desired to gain access;

b. transmitting the control signal to said relay station;

c. receiving the control signal relayed back from the relay station;

d. generting an access signal a predetermined time after initiation of the control signal;

e. determining if said assigned frequency is present during the interval of said access signal.

13. The method of claim 12 comprising repeating steps (a) through (e) for a plurality $m$ of succeeding frames and counting the number of times the assigned frequency occurs during the presence of the access signal interval in m succeeding frames.

14. The method of claim 12 further comprising the step of adjusting the initiation of the access signal relative to the initiation of the control signal to compensate for the time interval required for the control signal to travel up and back between the T/R station and the relay station.

15. The method of claim 12 further comprising the step of altering the direction of change of frequency of the control signal during succeeding frames to prevent any frequency deviation in the control signal from erroneously yielding a favorable comparison condition due to such frequency deviations.

16. The method of claim 12, wherein step (a) further comprises generating an odd number of frequency sweeps during a frame and step (d) further comprises generating the access signal only during the first one of the odd number of frequency sweeps during a frame, whereby the direction of sweep changes during each succeeding frame.

17. The method of claim 16 further comprising the step of disabling the control signal during frequency sweeps subsequent to the first sweep to prevent plural, and hence possible erroneous checks upon the time position of the access signal within a single frame.

* * * * *